United States Patent [19]

Eldridge

[11] Patent Number: 5,092,656
[45] Date of Patent: Mar. 3, 1992

[54] AUTOMATIC LATCHING DEVICE FOR TAILGATE

[75] Inventor: Joseph L. Eldridge, Libertyville, Ill.

[73] Assignee: Payhauler Corporation, Batavia, Ill.

[21] Appl. No.: 624,490

[22] Filed: Dec. 6, 1990

Related U.S. Application Data

[63] Continuation of Ser. No. 416,292, Oct. 2, 1989, abandoned.

[51] Int. Cl.$^5$ .............................................. B60P 1/273
[52] U.S. Cl. ................................ 298/23 S; 298/23 F; 298/23 DF
[58] Field of Search ................ 298/23 R, 23 S, 23 A, 298/23 F, 23 D, 23 DF, 23 B, 23 M, 23 MD, 23 TT, 38

[56] References Cited

U.S. PATENT DOCUMENTS

| | | |
|---|---|---|
| 1,250,838 | 12/1917 | Frank ............................ 298/23 A |
| 1,481,538 | 1/1924 | Crooke . |
| 1,612,223 | 12/1926 | Robinson . |
| 2,023,330 | 12/1935 | Linn . |
| 2,219,256 | 10/1940 | Evangelista . |
| 2,316,826 | 4/1943 | Wachter . |
| 2,394,153 | 2/1946 | Correa . |
| 3,077,841 | 2/1963 | Lunde ................................ 298/38 |
| 3,272,552 | 9/1966 | Park . |
| 4,323,279 | 4/1982 | Domes et al. ................... 298/23 DF |
| 4,348,055 | 9/1982 | Meisner et al. ................ 298/23 DF |
| 4,569,187 | 2/1986 | Spiker et al. .................... 298/23 F X |
| 4,665,649 | 5/1987 | Hurd, Jr. ......................... 298/23 S X |
| 4,877,366 | 10/1989 | De Filippi .................... 298/23 M X |

FOREIGN PATENT DOCUMENTS

| | | | |
|---|---|---|---|
| 557701 | 8/1932 | Fed. Rep. of Germany .... 298/23 S |
| 0716890 | 2/1980 | U.S.S.R. ............................ 298/23 F |

Primary Examiner—David A. Bucci
Assistant Examiner—William M. Hienz
Attorney, Agent, or Firm—McDermott, Will & Emery

[57] ABSTRACT

A dump truck is provided with a dump body having a tailgate. A lever arm having a first end and a second end is pivotably attached to the dump body. The first end is fixedly attached to the tailgate and the second end is attached to a latching device which locks the position of the lever arm. When the dump body is raised, the latching device is deactivated and the position of the lever arm is unlocked. When the dump body is lowered, the latching device is activated and locks the position of the lever arm, thereby locking the position of the tailgate.

17 Claims, 4 Drawing Sheets

AUTOMATIC LATCHING DEVICE FOR TAILGATE

This application is a continuation of application Ser. No. 07/416,292, filed Oct. 2, 1989, now abandoned.

BACKGROUND

This invention relates to tailgates used on dump trucks. More specifically, this invention relates to a device for locking the position of a tailgate.

Dump trucks include tailgates which open to release material loaded in the dump body of the truck. A common problem with tailgates for dump trucks is ensuring that they remain tightly closed until it is desired that they are opened. Often dump trucks travel over rough terrain, which causes the tailgate to open slightly and spew material on the roadway. Avoiding spillage on a haul road is important as this minimizes the maintenance of the haul road and may prevent undesirable damage to the rubber tires of most dump trucks. Clean roads also allow for higher speeds and the attendant higher productivity resulting therefrom. Ensuring that the tailgate remains tightly closed prevents spillage of the load and allows for better utilization of the capacity of the truck load carrying body. Known prior art solutions to this problem have generally been complicated mechanisms for latching the tailgate shut. Examples of such prior art solutions may be found in U.S. Pat. Nos. 3,272,552; 2,023,330; 2,219,256; 1,612,223; 2,316,826; 2,394,153; and 1,481,538.

SUMMARY OF THE INVENTION

The present invention is directed to a latching device for a tailgate of a dump truck. The latching device includes a lever arm having a first end attached to the tailgate. The lever arm is pivotably attached to the dump body of the dump truck. Latching means are attached to a second end of the lever arm to lock the position of the lever arm. The latching means are deactivated when at least a portion of the dump body is raised.

An object of the present invention is to provide an automatic tailgate latching device.

A further object of the invention is to prevent accidental spillage of material loaded into the dump body of a dump truck.

An additional object of the invention is to provide a tailgate latching mechanism located away from the immediate vicinity of the tailgate.

Another object of the invention is to prevent dump truck tailgate from being raised by forces resulting from the movement of material in the dump body.

Still a further object of the invention is to prevent a dump truck tailgate from opening due to forces acting on the dump body.

Still a additional object of the invention is to provide an economical, efficient and simple latching device for a tailgate.

An advantage of the present invention is a latching mechanism which is automatically operated in conjunction with the raising or lowering of a dump body of a dump truck.

A further advantage of the invention is the elimination of complex latching equipment.

An additional advantage of the invention is a latching mechanism that does not require activation or deactivation by an operator.

Another advantage of the invention is a latching mechanism which automatically releases when the dump body of a dump truck is raised.

Still another advantage of the invention is a latching mechanism which automatically locks a tailgate closed when a dump body of a dump truck is lowered.

DETAILED DESCRIPTION OF THE PRESENTLY PREFERRED EMBODIMENT

Figure 1:
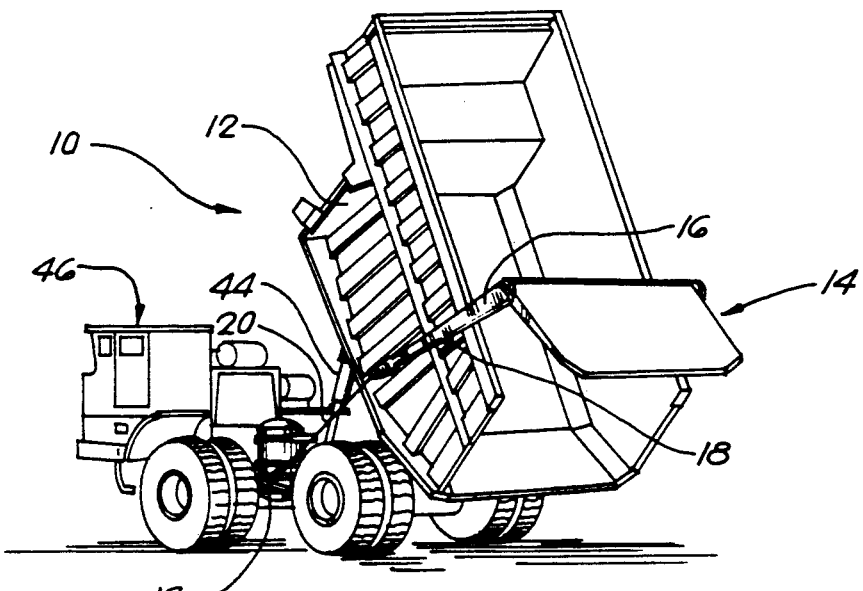
FIG. 1 is a perspective view of a dump truck embodiment wherein the dump body has been hoisted to a dumping mode.

FIG. 1 shows a perspective view of a dump truck 10 in a dumping mode showing the dump body 12 raised to allow discharge of the load (not shown). In a preferred embodiment, a tailgate 14 is pivoted on the dump body 12 about lever arm pivot pin 18 via lever arm 16 which is fixedly attached to the tailgate 14, and is attached to the truck frame 19 via cable 20. In this manner, the tailgate 14 will swing to an open position as the dump body 12 is raised. The tailgate 14 may be of a conventional type that seals the extreme end of the dump body 12. Such a tailgate that is automatically opened and closed as the dump body is raised and lowered, respectively, may be of the type disclosed in U.S. Pat. No. 4,323,279, the description of which is incorporated by reference or of the type disclosed in U.S. Pat. No. 4,348,055, the description of which is also incorporated by reference.

Figure 2:
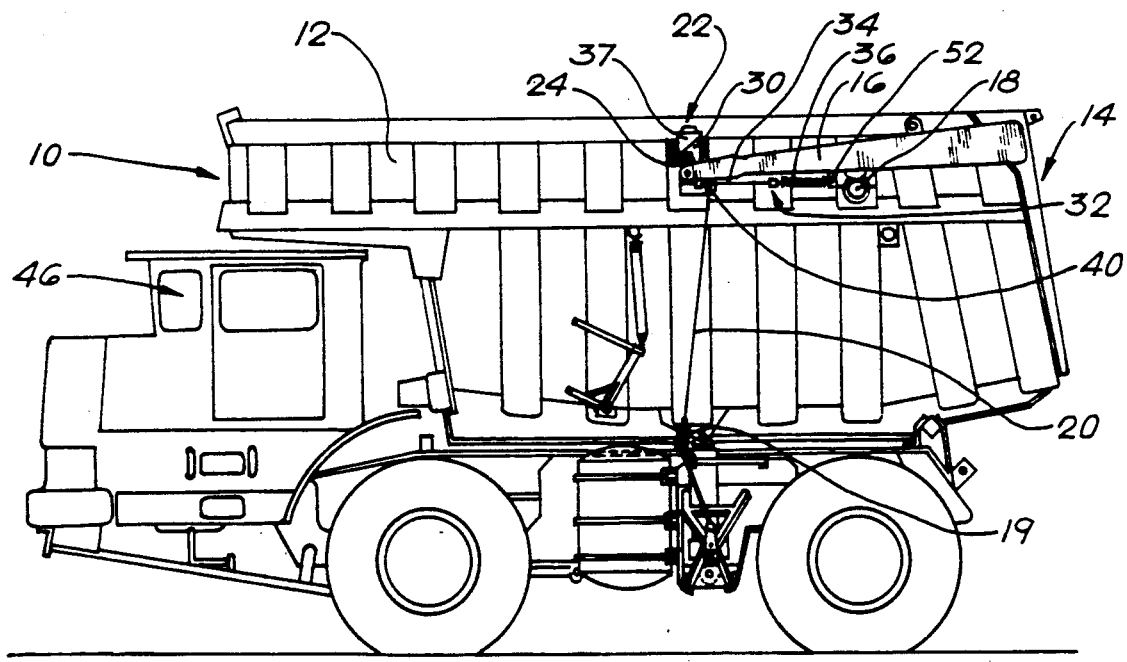
FIG. 2 is a side elevation of a dump truck incorporating the tailgate locking device of the present invention.
Figure 3:
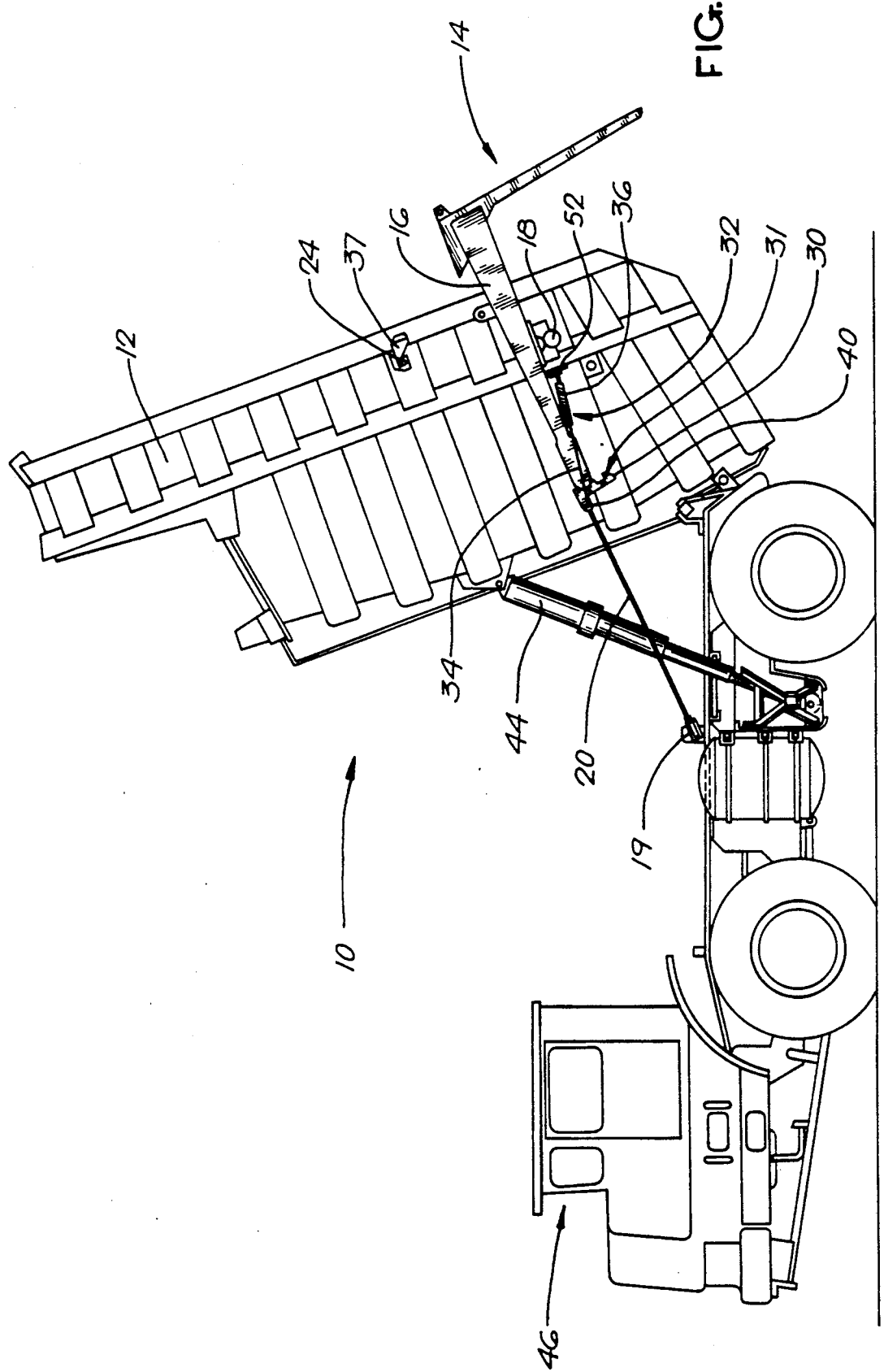
FIG. 3 is an elevation view of the dump truck of FIG. 2 in a dumping mode.

FIGS. 2 and 3 show the dump truck 10 in a non-dumping mode and a dumping mode, respectively. As shown in FIG. 2, in the non-dumping mode, the tailgate 14 seals the extreme end of the dump body 12. The position of the lever arm 16 is locked by latching means 22. Since the lever arm 16 is fixedly attached to the tailgate 14, once the position of the lever arm 16 is locked, the position of the tailgate 14 is locked. Thus, when the dump truck 10 is in the non-dumping mode, the dump body 12 is in a lowered position, the lever arm 16 is in a locked position, and the tailgate 14 is locked in a closed position.

As shown in FIG. 3, in the dumping mode, the dump body 12 is raised by hoisting means, such as one or more hydraulic cylinders 44 or other similar means. As the dump body 12 rises, the latching means 22 is disengaged by means of the force created due to cable 20 being fixedly attached to truck frame 19. Also as a result of this force, the lever arm 16 pivots about lever arm pivot pin 18 such that the tailgate 14 is swung to an open position.

Figure 5:
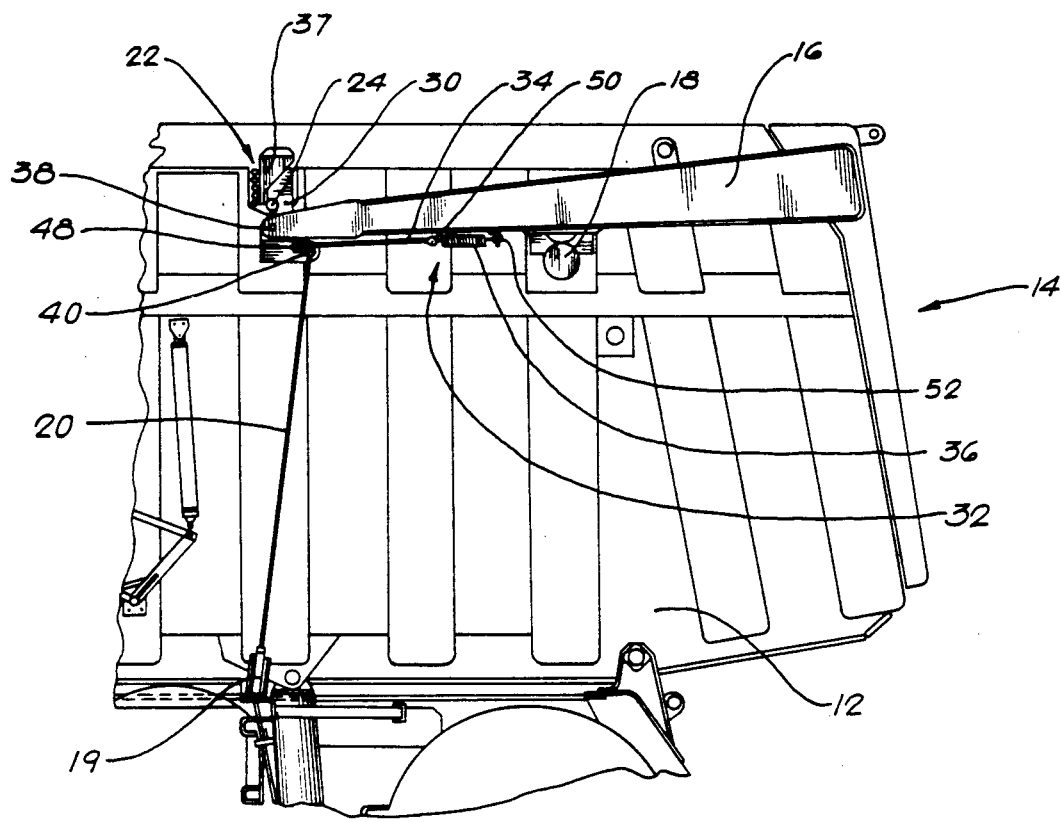
FIG. 5 is an elevation view of a portion of a dump truck showing the tailgate locking device of the present invention.

As shown in detail in FIG. 5, the latching means 22 includes a hook 30 pivotably mounted to lever arm 16 via pivot pin 38, and a pin 24 fixedly mounted to the dump body 12. Hook 30 defines a sloped edge 31. Preferably, the angle of the sloped edge 31 is 45 degrees with respect to the surface on which the dump truck 10 rests. Cable 20 is attached to the hook 30 at cable attachment point 40.

Hook return means 32 in the form of rod 34 and spring 36 act to bias the hook 30 into engagement with the pin 24. Rod 34 has two flat portions 48, 50. Flat portion 48 is pivotably attached to the hook 30 approximately at the cable attachment point 40. Flat portion 50 is attached to spring 36 via a hole in flat portion 50. Spring 36 is fixedly attached to lever arm 16 via attachment plate 52. Sheath 37 is attached to the dump body 12 and shields the hook 30 when it engages pin 24.

Figure 6:
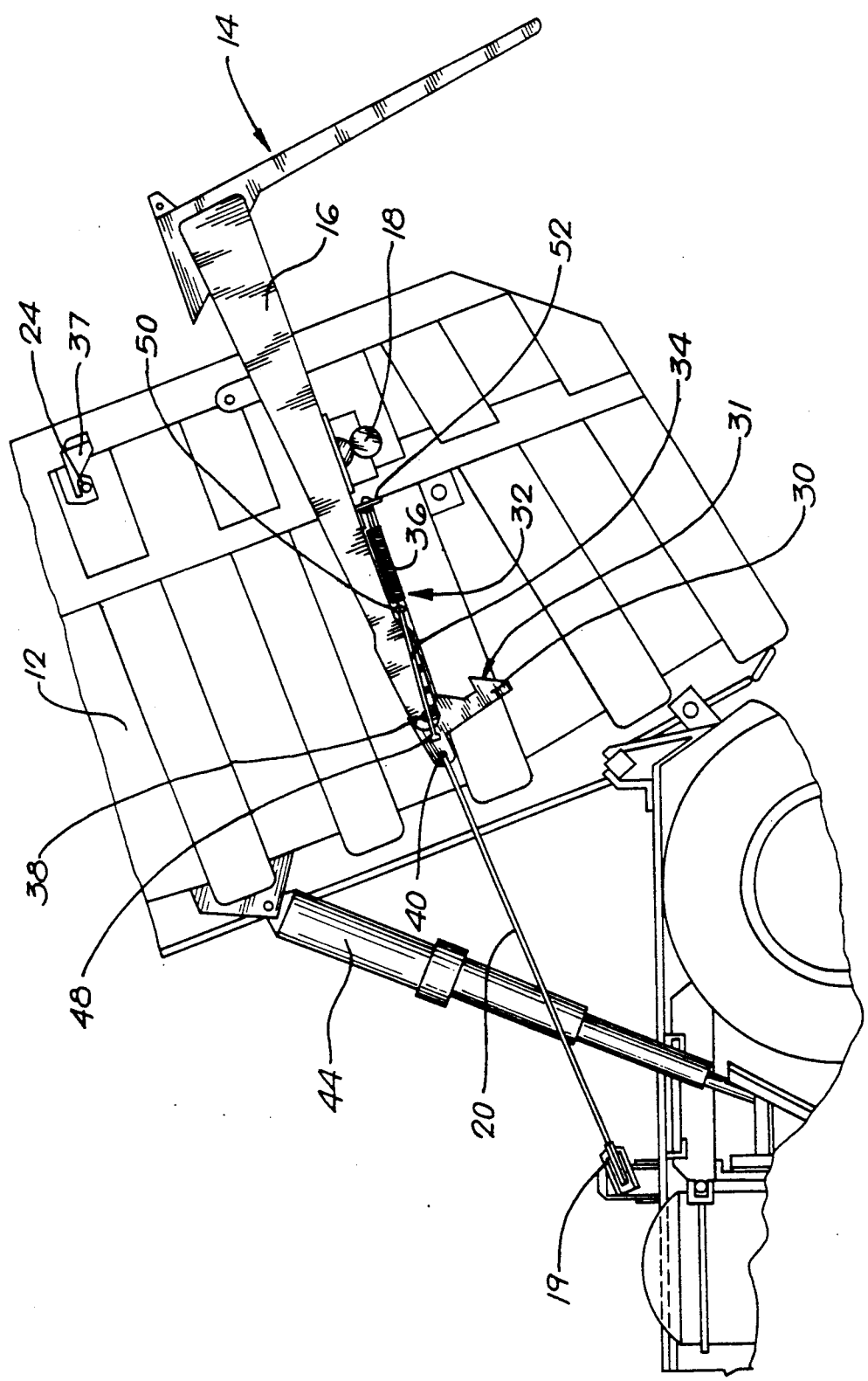
FIG. 6 is an elevation view of a portion of a dump truck showing the tailgate locking device of the present invention wherein the dump body has been hoisted to a dumping mode.

Turning now to the operation of the embodiment of the invention, as shown in FIG. 6, when the dump body 12 is raised to a dumping position, the hydraulic hoisting cylinder 44 push the portion of the dump body 12 closest to the cab 46 upward. Since cable 20 is anchored to the truck frame 19, as the dump body 12 is raised, the hook 30 rotates about pivot pin 38 and the hook 12 is disengaged from pin 24. The hook 30 will rotate to a point where the cable attachment point 40 is an approximately minimum distance from the point where the cable 20 is attached to the truck frame 19. At that moment, as the dump body 12 continues to move upward, the lever arm 16 rotates about lever arm pivot pin 18. As the lever arm 16 rotates, the tailgate 14 is swung to an open position, as shown in FIGS. 1, 3 and 6.

When the dump body 12 is lowered by the hydraulic cylinder 44, the weight of the tailgate 14 forces the lever arm 16 to rotate in a clockwise direction a viewed in FIGS. 1, 2, 3, 5 and 6. As the dump body 12 approaches its down position and the tailgate 14 approaches its closed position, the cable 20 slackens and the hook 30 is forced to rotate in a counterclockwise direction, as viewed in FIGS. 1, 2, 3, 5 and 6, due to the hook return means 32. In this manner the hook 30 engages pin 24 to lock the position of the lever arm 16 and thus lock the tailgate 14 in its closed Position.

It is possible for a rock or other debris may become lodged between the dump body 12 and the tailgate 14 resulting in the tailgate 14 not fully closing. In such an instance edge 31 of hook 30 will rest against the pin 24 and the positions of the lever arm 16 and the tailgate 14 will not be locked. When the rock or debris is dislodged, the lever arm 16 will rotate slightly in a clockwise direction, as viewed in FIGS. 1, 2, 3, 5 and 6. Hook 30 will then move along the same general direction as the lever arm 16 resulting in edge 31 moving past pin 24 and the hook 30 engaging the pin 24, thereby locking the tailgate 14 in its closed position. In this way, the force against pin 24 is reduced, thus ensuring a longer useful life for the pin 24.

Figure 4:
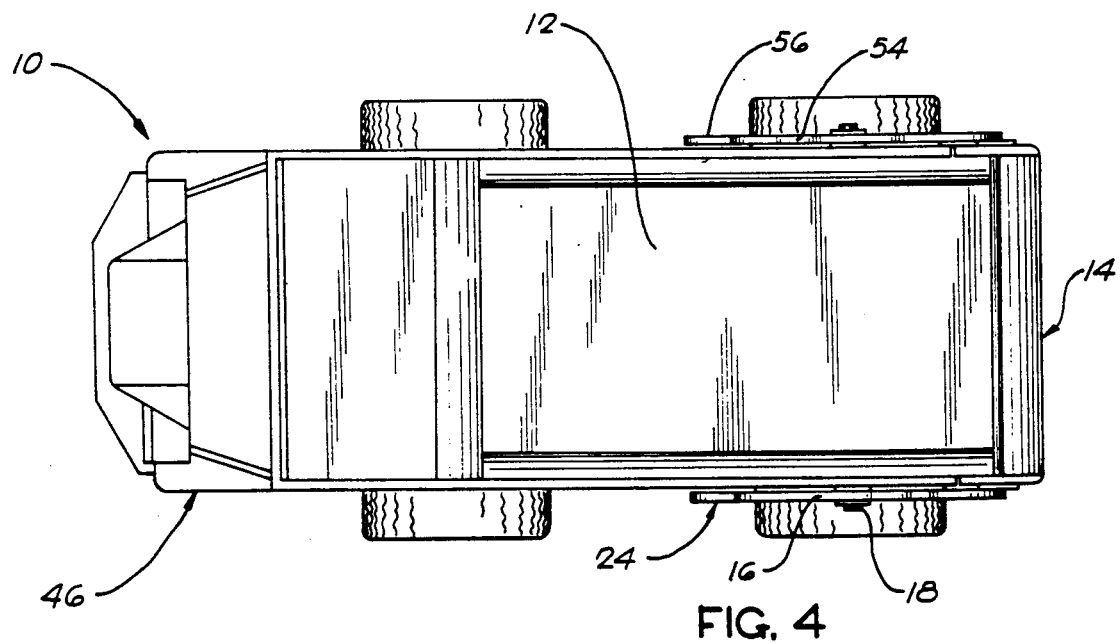
FIG. 4 is a top view of the dump truck of FIG. 2.

As shown in FIG. 4, a second lever arm 54 and a second locking means 56 may be employed on the side of the dump body opposite lever arm 16 and latching means 22. Lever arm 54 and looking means 56 are the mirror image of lever arm 16 and latching means 22 and operate in the same manner using a second cable (not shown). The use of two lever arms and two locking means further ensures that the tailgate 14 will not inadvertently open or spew a portion of the load. It is also possible for two lever arms and only one locking means to be employed.

Spring 36 can be of any type, e.g., coil, torsion, leaf, gas, or rubber. In addition the spring 36 could be replaced by a counterbalancing weight. The pin 24 may employ a rolling element to reduce friction. An example of such a pin is a cam follower, model number H80LW, manufactured by Roller Bearing Company of America (RBC) of West Trenton, New Jersey.

Preferably, spring 36 is a steel coil spring with a maximum tension of approximately 500 pounds; hook 30 is made of steel. Pin 24 may be made of steel, be 1.25 inches in diameter, be 3.8 inches long, and have a threaded end portion which passes through a hole (not shown) in the dump body 12 and is secured by a nut (not shown). Preferably, rod 34 is made of steel, is 0.62 inches in diameter and is 26.5 inches in length; sheath 37 is made of steel and is bolted to the dump body 12; lever arm 16 is welded to tailgate 14; cable 20 is received by a hole in hook 30 and is looped to attach to itself; and lever arm 16 is attached to the top half of the tailgate 14.

Of course it should be understood that various changes and modifications to the preferred embodiment described herein will be apparent to those skilled in the art. Such changes and modifications can be made without departing from the scope of the present invention and without diminishing its attendant advantages. It is, therefore, intended that such changes and modifications be covered by the following claims.

We claim:

1. A tailgate latching device for a dump truck comprising:
    a load carrying means including a dump body and a tailgate;
    a pin fixedly attached to said dump body;
    a tailgate lever arm pivotably attached to said dump body;
    said tailgate lever arm having a first end and a second end, said first end fixedly attached to said tailgate;
    a hook pivotably attached to said second end of said tailgate lever arm, wherein said hook is adapted to engage said pin; and
    means for automatically rotating said hook out of engagement with said pin when at least a portion of said dump body is raised to a load dispensing position.

2. The device of claim 1 wherein said dump truck includes a frame and wherein said rotating means includes a cable having a first end and a second end wherein said cable first end is attached to said hook and wherein said cable second end is attached to said frame of said dump truck.

3. The device of claim 2 wherein said hook defines a sloped edge.

4. The device of claim 3 further comprising a sheath for receiving at least a portion of said hook.

5. The device of claim 1 further comprising means for rotating said hook into engagement with said pin when said dump body is lowered from said load dispensing position.

6. The device of claim 5 wherein said means for rotating said hook into engagement with said pin includes resilient means attached to said hook.

7. The device of claim 6 wherein said resilient means is attached to said tailgate lever arm.

8. A tailgate latching device for a dump truck comprising:
    a load carrying means including a tailgate and a dump body;
    a pin fixedly attached to said dump body;
    a tailgate lever arm pivotably mounted to said dump body, said tailgate lever arm having a first end and a second end, said first end fixedly attached to said tailgate;

latching means located entirely at a point remote from said tailgate and attached to said second end of said tailgate lever arm for locking the position of said lever arm with respect to said dump body, said latching means adapted to engage said pin; and means for automatically controlling said latching means based on the vertical positioning of said dump body.

9. The device of claim 8 wherein said latching means is pivotably attached to said second end of said tailgate lever arm.

10. The device of claim 8 further comprising means for deactivating said latching means.

11. A tailgate latching device for a dump truck comprising:

load carrying means including a dump body and a tailgate;

a pin fixedly attached to said dump body;

a tailgate lever arm pivotably mounted to said dump body, said tailgate lever arm having a first end and a second end, said first end fixedly attached to said tailgate;

latching means, located entirely at a point remote from said tailgate and attached to said tailgate lever arm for locking the position of said lever arm with respect to said dump body, said latching means including means to engage said pin; and means for automatically activating said latching means.

12. The device of claim 11 wherein said latching means is attached to said second end of said tailgate lever arm.

13. The device of claim 12 wherein said pin engaging means is a hook.

14. The device of claim 11 further comprising means for automatically deactivating said latching means.

15. The device of claim 14 wherein said latching means is deactivated when at least a portion of said load carrying means is raised to a load dispensing position.

16. The device of claim 15 wherein said latching means is activated when said load carrying means is lowered from said load dispensing position.

17. The device of claim 13 further including a sheath attached to said load carrying means for receiving at least a portion of said hook when said hook engages said pin.

* * * * *